Dec. 8, 1931.　　　L. L. RECTOR　　　1,834,968
CASING AND TUBING HEAD SUSPENSION
Filed April 24, 1931　　2 Sheets-Sheet 1
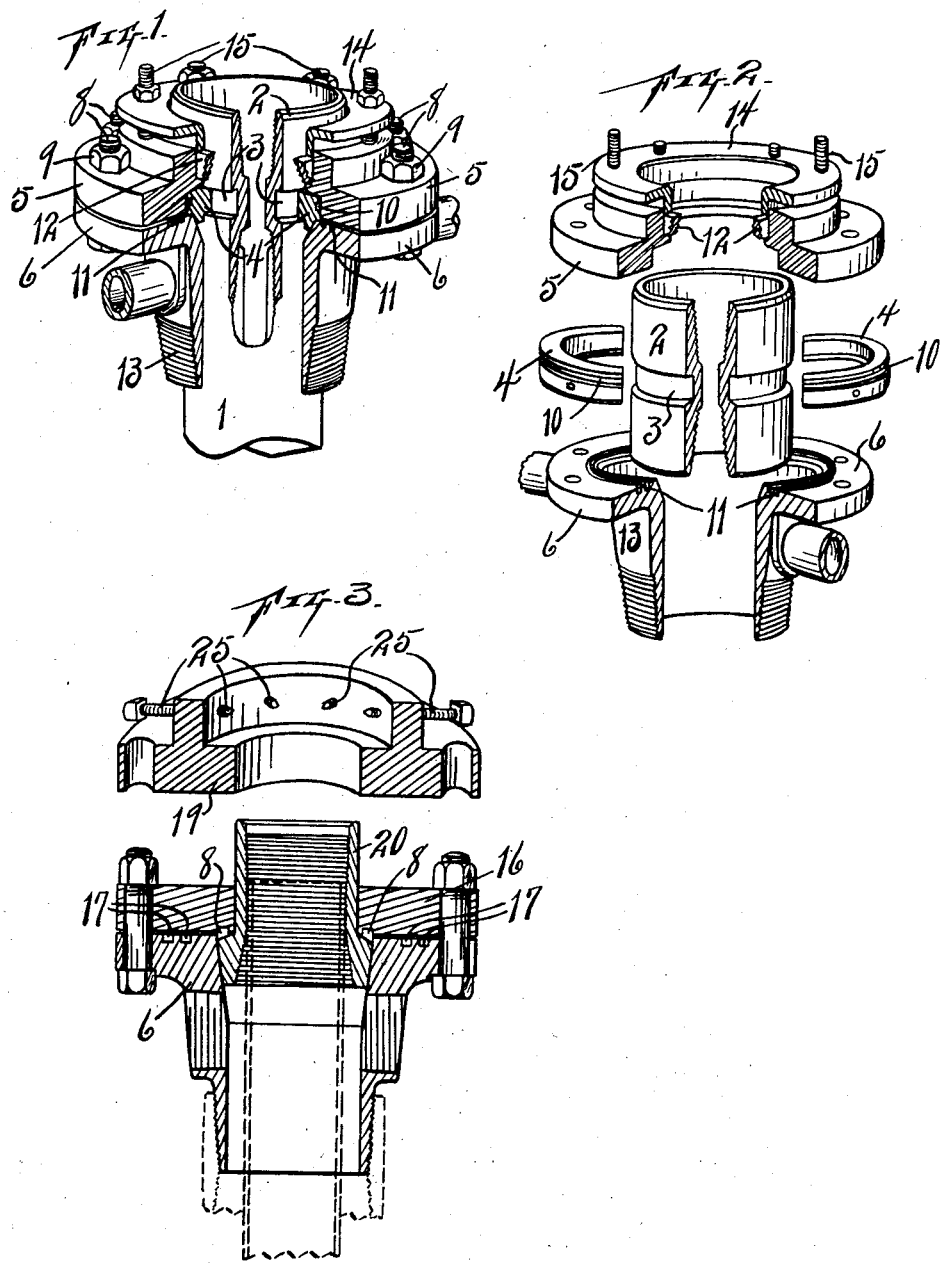
INVENTOR
LAURENCE L. RECTOR.
BY
ATTORNEY Dec. 8, 1931.　　　　L. L. RECTOR　　　　1,834,968
CASING AND TUBING HEAD SUSPENSION
Filed April 24, 1931　　2 Sheets-Sheet 2
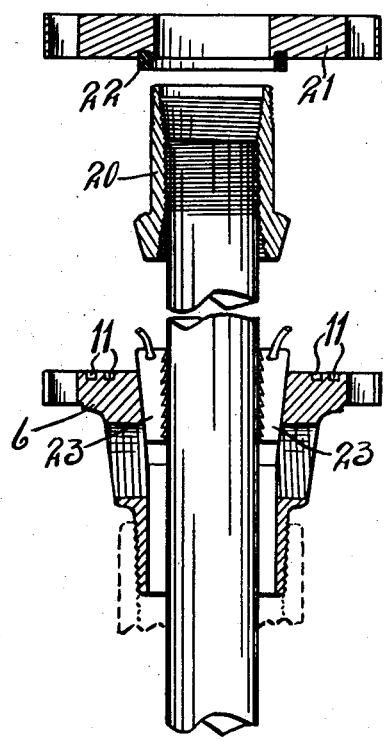
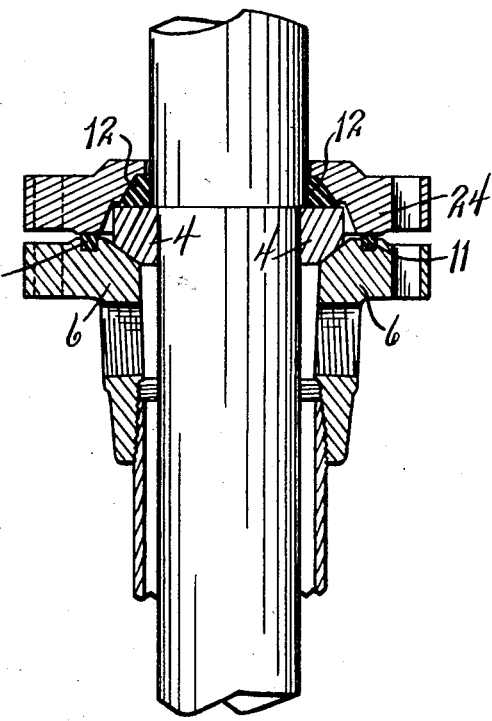
INVENTOR
LAURENCE L. RECTOR
BY A. L. Jackson
ATTORNEY Patented Dec. 8, 1931

1,834,968

UNITED STATES PATENT OFFICE

LAURENCE L. RECTOR, OF FORT WORTH, TEXAS

CASING AND TUBING HEAD SUSPENSION

Application filed April 24, 1931. Serial No. 532,536.

My invention relates to tubing and casing suspension and more particularly to certain fixtures for preventing accidents and for preventing damage in case of accidents; and the object is to provide certain safety devices for handling well tubing and casing and for making the handling of tubing and casing easily and quickly accomplished and which will protect the workmen, and to provide devices and improved construction which will be safe in operation. Other objects and advantages will be fully explained in the following description and the invention will be more particularly pointed out in the claims.

Reference is had to the accompanying drawings which form a part of this application.

Fig. 1 is a broken vertical section of the casing and tubing head, assembled.

Fig. 2 is a vertical section of the same with the parts separated.

Fig. 3 is a vertical section, showing a slight variation in construction from the previously shown construction.

Fig. 4 is a vertical section, illustrating the interchangeability of the tubing collar and the slips.

Fig. 5 is a vertical section showing a variation in the provision for packing between the top flange and the bottom flange.

Similar characters of reference are used to indicate the same parts throughout the several views.

Considering Fig. 1, a pipe 1 is shown with a pressure head applied thereto. A double collar 2 is shown with an annular groove 3 in the outer periphery. A split ring 4 engages the collar 2 in the groove 3. The split ring is supported between the upper flange 5 and the lower flange 6. The flanges 5 and 6 are cut away at their meeting faces adjacent to the tubing collar 2 to receive the split ring. The top 5 and bottom 6 flanges are clamped together by bolts 8 and nuts 9. The split ring 4 is provided with packing 10 in the periphery thereof and hydraulic packing 11 is provided between the meeting faces of the top flange 5 and the bottom flange 6. Rubber packing 12 is applied to the inner face of the top flange 5 for engaging the collar 2. The form illustrated in Figs. 1 and 2 is thus provided with triple sealing means. The bottom flange 6 has an extended sleeve 13 which is tapered and threaded exteriorly to be screwed into a support. A stuffing box 14 is attached to the top flange by stud bolts 15.

This construction makes a protection in case of fire. Should fire occur the head may be readily repacked due to the lack of escaping volume which is prevented by the tight metal to metal joint and the casing cannot collapse in case of fire. In the event repacking is necessary on account of fire, no derrick is required, as the top flange 5 can be raised and repacked without disturbing the pipe. The head is ideal for use in carrying pipe while drilling in with cable tools, either drilling dry or circulaton method. The split rings support the casing under any collar, the double collar being used for permanent support.

As a matter of safety to workmen, gas lines to take gas from wells can be connected before starting to run casing, and in most instances before gas is encountered. In case the well flows by heads when running casing, a collar can be stopped in the stuffing box until the well has ceased flowing. Casing can be run and pulled through the head with split rings removed, which permits men to work in the dry under most circumstances.

If the operator knows casing point, the top flange and split rings can be applied on the derrick floor and lowered to bottom flange in cellar into its exact centered position, instantly closing off practically all gas. The workmen are not required to enter the cellar until all gas is practically shut off. By reason of the bevel of the bottom of the split ring, this ring centers the casing automatically in the bottom flange.

The above description applies to the high pressure control head as illustrated in Figs. 1 and 2. The high pressure tubing head is shown in Fig. 3. This high pressure tubing head has the same metal to metal contact on the lower or bottom flange 6 by reason of the flat perforated disk 16 and packing 17 and 18. The top flange 19 engages the tubing collar 20. The tubing collar 20 is tapered and seats in the bottom flange 6. In case of fire, the tubing head will stand the strains caused by heat and will not permit the tubing to drop out of the head, thus eliminating the use of tubing slips in supporting tubing.

The tubing head adapter (see Fig. 3) includes the tubing head top flange 19 with regulation ring 16 and set screws 25 permanently attached for application of oil saver. This is left on the well only when the well will not permit dismantling the oil saver after the tubing is inserted. The regular practice is to remove the adapter and oil saver, seat the tubing by means of the combination collar 2 and complete the installation by using the top flange 5. This permits the operator to move the adapter flange and oil saver to his next well.

Fig. 4 shows a similar tubing collar 20. A top flange 21 is provided with packing 22. This collar fits over tubing collar 20. This Fig. 4 illustrates how the tubing collar is interchangeable with tubing slips 23 for suspending casing. This form, Fig. 4, has the same tight metal to metal contact with packing 11 and 22.

Fig. 5 shows the bottom flange 6 with a top plate or flange 24, making the tight metal to metal joint, split ring 4, packing 11 interposed between the two flanges, and rubber packing 12.

What I claim, is,—

1. A casing and tubing head suspension comprising upper and lower flanged collars having meeting faces provided with grooves in the lower flanged collar and packing in said grooves, the lower flanged collar having its inner periphery beveled at the upper end, the upper flanged collar having an annular cut-out in its inner lower face, and a split ring mounted in said cut out and having its lower outer end beveled for engaging the beveled portion of said lower flanged collar, and a collar having an annular exterior groove for receiving said split ring and having interior threads for engaging tubing.

2. A casing and tubing head suspension comprising upper and lower flanged collars having meeting faces and packing interposed in the meeting faces, said lower collar having its inner periphery beveled at the upper end and said upper collar having a cut-out in its inner periphery at the lower end, a split ring mounted in said cut-out and provided with packing in its outer periphery engaging said upper collar in said cut-out, a double collar having an annular groove in its outer periphery to receive said split ring, said split ring having its lower end beveled to engage the beveled portion of said lower collar, and packing in said upper flanged collar for engaging said double collar.

3. A casing and tubing suspension comprising upper and lower flanged collars engaging each other with a metal to metal sealing joint and packing interposed in said joint, said lower collar having its lower end tapered and threaded exteriorly for engaging a support and having its inner periphery beveled at the upper end, said upper collar having a cut-out in its periphery at the lower end, and a split ring mounted in said cut-out and having a beveled exterior portion engaging the beveled portion of said lower collar.

In testimony whereof, I set my hand, this 20th day of April, 1931.

LAURENCE L. RECTOR.